Oct. 26, 1971     B. NYSTEN     3,614,815
SNAP FASTENER
Filed May 8, 1969     2 Sheets-Sheet 1
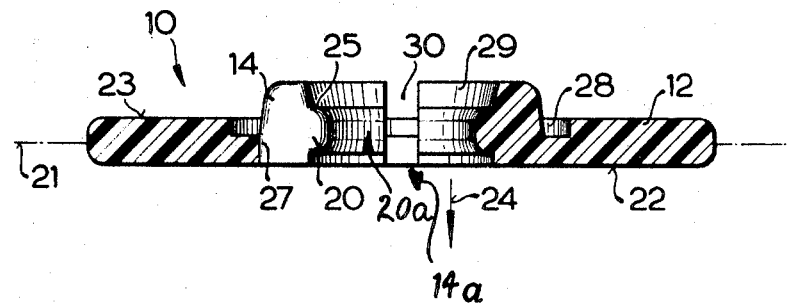
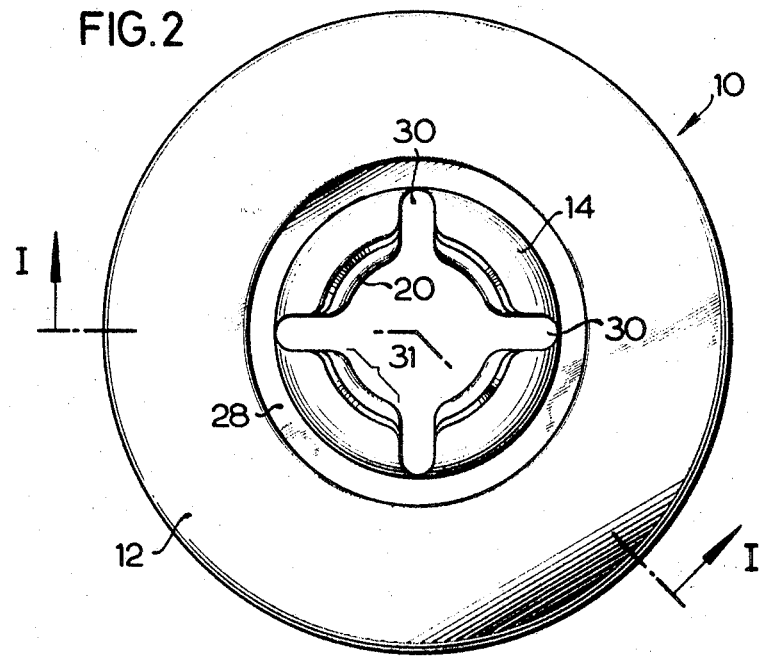
INVENTOR
BERNHARD NYSTEN United States Patent Office 3,614,815
Patented Oct. 26, 1971

3,614,815
SNAP FASTENER
Bernhard Nysten, Aachen, Germany, assignor to William
Prym-Werke KG, Stolberg-Rhineland, Germany
Filed May 8, 1969, Ser. No. 822,879
Claims priority, application Germany, May 9, 1968,
P 17 60 372.4
Int. Cl. A44b 17/00
U.S. Cl. 24—216                                            8 Claims

ABSTRACT OF THE DISCLOSURE

A female socket portion has a center aperture one axial side of which has an inlet. An opening is defined within the aperture by an inwardly projecting annular bead which has an axial endface directed toward the other axial side and closer to the same than to the inlet. The head of an undercut male coupling portion is insertable through the inlet and with a snap action through the opening; it has an annular contact face directed towards the inlet and engaging the axial endface of the bead.

BACKGROUND OF THE INVENTION

The present invention relates to snap fasteners in general, and more particularly to snap fasteners consisting of a male and a female component which are at least in part composed of resiliently deformable material.

It is already known to make such snap fasteners, and quite frequently they are made of a synthetic plastic material. The female snap fastener is provided with a flange surrounding a socket having an aperture which is formed with a portion of reduced cross section. The male component is provided with an undercut coupling head which can be inserted through the portion of reduced cross section with a snap action. In all of the snap fastener constructions known to me from the prior art the contact zone in the socket portion, that is the zone which contacts the coupling portion of the male component, faces the end of the aperture through which the male components is introduced. This brings with it the disadvantage that the flanges provided on the male and female portions respectively, are located relatively far spaced from one another when the coupling portion of the male component is received in the aperture of the socket portion of the female component. Thus, forces which must be transmitted from one of the components to the other can undergo such transmission only via the connected portions of the two components, but not via the flanges of the two components because they are not in contact with one another. The problem here is that the connected portions, that is the portions of the two components which engage one another with a snap action, may be damaged if the force exerted upon the components exceeds certain limits, and the results of this may be damage to the connected portions or even the destruction thereof.

This is by no means the only problem which has been encountered in existing prior-art constructions. A further problem resides in the fact that these constructions require a greater force for establishing a snap-action connection between the components, than for separating this connection. In fact, tests have shown that frequently, the force required for establishing the connection is three times as great as the force required for separating the connection. This is, of course, an entirely disadvantageous situation which will be evident if one considers that it is the purpose of a snap fastener to prevent undesired separation of its components—and thereby of the elements to which the components are secured and which are to be connected by the components—but that there is hardly ever any danger that the components of the snap fastener might undesirably become connected.

SUMMARY OF THE INVENTION

It is, accordingly, an object of the present invention to overcome the disadvantages set forth above.

More particularly it is an object of the present invention to provide an improved snap fastener which is not possessed of these disadvantages.

Still a further object of the invention is to provide such a snap fastener which is relatively simple in its construction and therefore uncomplicated and inexpensive to manufacture.

A concomitant object of the invention is to provide such a fastener wherein the relationship of forces required for establishing and separating the connection between the components of the snap fastener can be readily varied in the manufacture of the snap fastener by simple and uncomplicated dimensional changes.

In pursuance of the above objects, and others which will become apparent hereafter, one feature of my invention resides in the provision of a snap fastener which, briefly stated, comprises a male component provided with an undercut coupling portion having a neck and a head which projects transversely of the neck and which is formed with an annular contact surface facing in the direction of the neck. A female component includes a socket portion which is provided with an aperture bounded by an inner circumferential surface and which has an inlet for the coupling portion of the male component. A flange surrounds the socket portion and extends therefrom. This flange has two spaced opposite sides and the inlet of the aperture is located at one of these sides. An annular bead projects from the inner circumferential surface bounding the aperture and extends transversely of the latter so as to define an opening—that is a portion of decreased diameter—which is so dimensioned as to permit passage of the head of the undercut coupling portion with a snap-action. The bead has an axial end face which faces away from the aforementioned one side, that is from the inlet, and which abuttingly engages the annular contact surface on the undercut coupling portion in response to passage of the head of the latter through the opening from the inlet toward the other side. The axial end face on this bead is spaced from the aforementioned one side of the flange by a distance which is greater than its distance from the other side of the flange. Finally, I provide a weakened zone in the female component radially outwardly of the aperture.

With this construction the force required for separating the male component and the female component from one another can be increased very significantly and can readily be made equal or substantially equal to the force required for connecting these components in the first place. The reason for this will be discussed in more detail subsequently.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is an axial section through a female snap fastener component, taken on the line I—I of FIG. 2;

FIG. 2 is a top-plan view of the female snap fastener component which is shown sectioned in FIG. 1;

DESCRIPTION OF THE PREFERRED EMBODIMENTS

Figure 3:
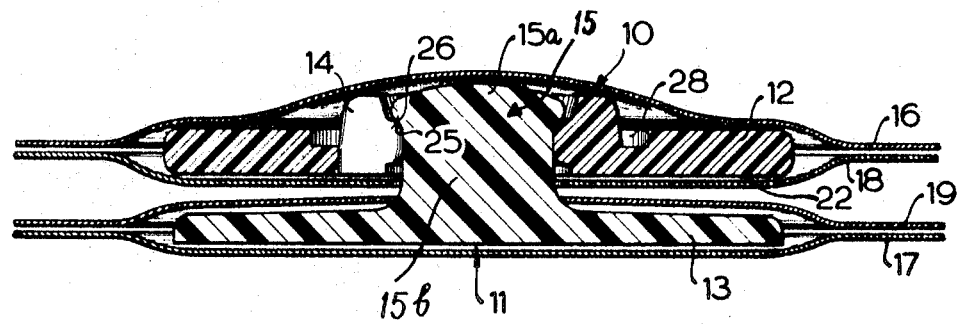
FIG. 3 is a view similar to FIG. 1 but showing both the female and an associated male snap fastener component in connected condition.

Discussing firstly the female component illustrated in FIGS. 1 and 2 it is emphasized that it will advantageously consist of a resiliently deformable synthetic plastic material, such as acetal resins, and is of one-piece construction. Both the female component in FIGS. 1 and 2 and the male component in FIG. 3 are shown on a considerably enlarged scale and are, in fact, shown approximately ten times larger than normal life size.

The female component is identified with reference numeral 10 and is provided with a radially extending flange 12 carrying a socket portion 14 which is formed with an aperture 14a extending from the one side 22 of the flange 12 to the other side 23 thereof. In fact, the socket portion 14 projects axially beyond the other side 23 of the flange 12, and the aperture 14a extends all the way through the socket portion 14 in the illustrated embodiment.

The inner circumferential surface bounding the aperture 14a is provided with a radially inwardly projecting annular bead 20 which extends transversely of the aperture 14a and defines an opening or portion of reduced cross-section which is identified with reference numeral 20a and is so dimensioned as to permit passage therethrough of the head 15a of the undercut coupling portion 15 provided on the male snap fastener component 11 which is still to be described.

That axial end of the bead 20 which faces away from the side 22 of the flange 12, that is which faces away from the inlet of the aperture 14a which is located at the side 22, is provided with an annular axial end face which, in accordance with the present invention, is spaced from the side 23 by a distance which is smaller than the distance by which it is spaced from the side 22. This is readily evident by inspection of FIG. 1, for example. It can also be stated differently by saying that the axial end face 25 is axially offset—in the direction away from the one side 22—with respect to the plane of symmetry 21which is identified by the broken line in FIG. 1.

The socket portion 14 is provided with a plurality of circumferentially spaced slots 30 which in the illustrated embodiment extend over the entire axial length of the socket portion 14 all the way to the side 22 of the flange 12. A weakened zone is provided in the female component 10, and in the illustrated embodiment the weakened zone is constituted by an annular groove 28 provided in the side 23 of the flange 12 and encircling the base of the socket portion 14, that is the juncture of the same with the flange 12.

FIG. 3 shows not only the female component 10, but also the male component 11 of the novel snap fastener. It will be seen that the male component 11 also is provided with a radially extending flange 13 and in addition with an undercut coupling portion 15 comprising a neck 15b projecting from the flange 13, and a coupling head 15a provided at the free end of the neck 15b and extending transversely of the latter. The undercut side of the head 15a, that is the side facing towards the neck 15b, is provided with an annular contact surface 26 facing towards the neck 15b.

It will be seen that as the neck 15a is introduced with a snap action through the opening 20a defined by the bead 20, its annular contact surface 26 moves into abutting engagement with the annular axial end face 25 provided on the bead 20.

In FIG. 3 the members to which the male and female components are respectively connected, are diagrammatically illustrated in form of lines which are identified with reference numeral 16 and 17, respectively. It shall here be assumed that reference numerals 16 and 17 each identify a layer of paper associated with the body and the flap of an envelope which is to be closed with the novel snap fastener. Of course, the material of the layers 16 and 17 need by no means be paper, nor need the snap fastener be used only with envelopes. However, for purposes of convenience this is the exemplary use chosen for purposes of illustration. In the illustrated embodiment the female component is connected with the layer 16 by means of an adhesive strip or patch 18 which is provided with a hole registering with the aperture 14a and which may or may not be self-adhesive, but in any case overlies the female component 10 and is in suitable manner secured—as by bonding or the like—to the layer 16. A similar strip or patch 19 secures the male component 11 to the layer 7, the hole in the strip or patch 19 allowing for passage of the undercut coupling portion 15 therethrough. It is evident, however, that other means of effecting connection of the male and female components to their respectively associated layers 16 and 17 can be chosen, for instance pronged rings replacing the patches 18 and 19 and provided with prongs which penetrate the respective layers 16 and 17 and are bent over, adhesives directly provided on the male and female components, threads by which the male and female components are sewn onto to their respective layers, or the like. In the latter case the components could be provided with an opening for passage of the needle as they are sewn to their respective layers.

In any case, allowing for the presence of the patches 18 and 19 or analogous means, the side 22 of the flange 12 will abut against the other side of the flange 13 when the male and female components 10, 11 are connected with one another, as shown in FIG. 3. It is true that in FIG. 3 no such abutment is illustrated, but this is only because the showing in FIG. 3 is diagrammatic and maximum clarity of illustration of the individual elements was desired.

If the components 10, 11 are to be subsequently disconnected they are moved relative to one another in the sense indicated by the arrow 24 in FIG. 1, that is the undercut coupling portion 15 is withdrawn from the female component in the direction of the arrow 24.

While connected, the contact face 26 and the end face 25 abut one another as shown in FIG. 3. This zone of contact is located at a side of the female component 10 which is remote from the side 22 of the flange 12 thereof. This is particularly clearly shown in the illustration of FIG. 4.

As already indicated, the base 27 of the socket portion 14 (compare FIG. 1) is provided with a weakened portion here illustrated by the annular groove 28. However, a kerf can be provided in the socket portion 15 in the region of the base 27, in place of the groove 28, or alternately in addition to the groove 28. In any case, the female component 10 is thus provided in the region of the base 27 with increased flexibility because the remaining portions of the flange 12 and the socket portion 14 are considerably more massive and thereby more resistant to flexing and bending. A portion 29 projects beyond the end face 25 and defines with the same a recess in which, as shown in FIG. 3, the head 15a of the undercut coupling portion 15 is accommodated when the components 10 and 11 are connected in the manner shown in FIG. 3.

Figure 4:
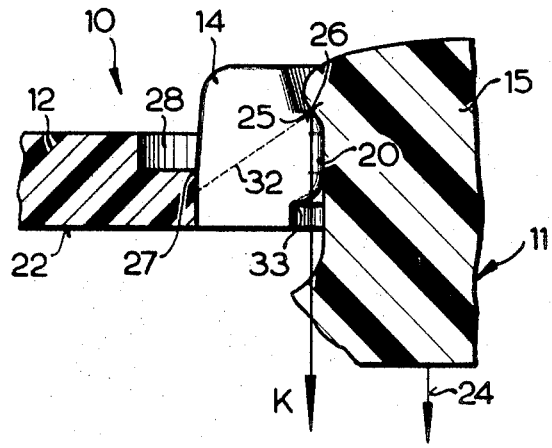
FIG. 4 shows, on an enlarged scale in fragmentary sectional illustration, the engagement portions of the male and female components illustrated in FIG. 3.

If, now, the components 10 and 11—which are connected in the manner shown in FIG. 3—are to be separated, a force is exerted upon the male component 11 in the direction of the arrow shown in FIG. 4. As a result of this there develops a force identified by the arrow K acting in the direction of that arrow, between the faces 25 and 26 and this force causes the individual sectors 31 of the female component 10, which have been provided by virtue of the existence of the slots 30, to attempt tilting in the direction of the force K about the associated part of the weakened zone 28. The sectors 31 in other words act, relative to the point of application of the force K, approximately in the manner of lever arms whose effective length is indicated by the dotted line 32 in FIG. 4. The torque resulting from the force K acting upon these lever arms 32 causes the same, that is the sectors 31, to attempt to move radially inwardly in the direction of the acting torque against the neck 15b of the undercut coupling portion 15 so that initially the coupling portion 15 is retained in connection with the female component 10 all the more firmly despite the force acting in the direction of the arrow 24. Only after the force has reached such a level that the elastically deformable material of one or both of the components is temporarily deformed in the region of the portions 14 and 15, can the coupling portion 15 be withdrawn from the aperture 14a.

In the embodiment illustrated in the drawing, the force necessary for separating the male and female components 10 and 11 is approximately the same as the force required for connecting them. This force necessary for effecting separation can, however, be readily increased by further offsetting the end face 25 in the direction away from the side 22 of the flange 12. Ordinarily this can be accomplished simply by shifting the entire bead 20 in the aforementioned direction so as to thereby increase the distance 33 (compare FIG. 4) between the side 22 of the flange 12 and that axial end face of the bead 20 which faces towards the side 22. This results of course in a comparable shifting of the axial end face 25 away from the side 22. Generally speaking it can therefore be said that the greater the distance 33, or the greater the distance between the end face 25 and the side 22, the greater will be the force necessary for separating the connected components 10 and 11 from one another.

It is evident, of course, that in pursuance of the inventive concept it is readily possible to construct a snap fastener which can be manipulated in a sense effecting connection of its male and female components without any difficulty, but which cannot be separated again without destroying one or both of the components. This may be desirable for certain applications, for instance, for one-way packages which are closed at the factory and with the provision of this type of snap fastener assures the customer that the contents have not been tampered with. Other applications will evidently suggest themselves readily to those skilled in the art. Any attempt heretofore to provide a snap fastener capable of meeting this requirement has always necessitated extra-large dimensioning of the coupling portion 15 with respect to the aperture of the socket portion 14, or extra small dimensioning of the aperture in the socket portion 14 with respect to the coupling portion 15. Not only did this necessitate the use of increased quantities of material per snap fastener, but also it evidently made the initial connection between the two components much more difficult. All of this can be avoided with the present invention where no increased quantities of material are necessary, and where no extreme dimensional variations of one of the components with respect to the other are required.

By way of example it may be mentioned that a further possible application for this type of snap fastener, that is a type of snap fastener which is so constructed in accordance with the present invention that it can be readily connected but not severed without destruction of one or both of its components, can be used for closing envelopes or the like. This makes it impossible to tamper with the contents of the envelope without either damaging or destroying one or both of the components of the snap fastener, or leaving visible evidence of tampering on the envelope itself.

Because in the snap fastener according to the present invention the flanges 12 and 13 abut one another, or are at least located very close to one another, the transmission of forces directly from one to the other of the flanges has become possible without such forces having to be transmitted via the connected portions 14 and 15. Thus, no forces act upon the forces 14 and 15 which could inadvertently damage them.

While the groove 28 is shown to be continuous (compare FIG. 2) it is also possible to make it discontinuous. If a kerf is provided in place of or in addition to the groove 28, it will advantageously be provided also in the region of the space 27 but in the socket portion 14 itself, for instance in the inner circumferential surface bounding the aperture 14a.

The slots 30 which are shown in FIGS. 1 and 2 are advantageous for enhancing the clamping effect exerted by the sectors 31 against the undercut coupling portion 15 when a force is exerted on the latter in the direction of the arrow 24. However, the invention will also be operative if such slots are not provided and if, accordingly, no individual sectors 31 exist. Another possibility is that the slots 30 may extend only part of the way in the socket portion 14, instead of over the entire axial length as shown in FIG. 1. The latter possibility is, however, preferred because it facilitates a radially inwardly directed tilting movement of the sectors 31 in response to the force acting in the direction of the arrow 24 upon the undercut portion 15.

Of course, the farther the distance between the end face 25 and the side 22, or the greater the distance 33, the greater will be the force required for withdrawing the coupling portion 15 from the socket portion 14, as already pointed out. It follows, from this, that a separation is possible only if the portions 14 and 15 undergo a greater elastic resilient deformation of their respective materials than in the illustrated embodiment. As indicated before, if the distance 33 is great enough, or if the distance between the end face 25 and the side 22 is large enough, the elastic deformation which is necessary to permit separation of the portions 14 and 15 from one another may become so great—if it is desired—as to result in actual destruction of one or both of the portions 14 or 15.

It will be understood that each of the elements described above, or two or more together, may also find a useful application in other types of constructions differing from the types described above.

While the invention has been illustrated and described as embodied in a snap fastener, it is not intended to be limited to the details shown, since various modifications and structural changes may be made without departing in any way from the spirit of the present invention.

What is claimed as new and desired to be protected by Letters Patent is set forth in the appended claims:

1. A snap fastener comprising, in combination, a male component provided with an undercut coupling portion having a neck and a head projecting transversely of said neck and formed with an annular contact surface facing in direction of said neck; and a female component including a socket portion provided with an aperture bounded by an inner circumferential surface and having an annular bead projecting from said inner circumferential surface transversely of said aperture and defining an opening dimensioned to permit passage of said head with a snap action, said bead having an axial end face facing away from said one side for abutting engagement with said contact surface of said head of said male component in response to passage of said head through said opening, a low-flexibility flange portion surrounding said socket portion and having two spaced opposite sides with said inlet being located at one side of said opposite sides, an annular higher-flexibility zone provided in said female component between said low-flexibility flange portion and said socket portion and having an other side facing away from said one side, and the distance between said one side and said axial end face being greater than the distance between said one side and said other side of said annular higher-flexibility zone and also greater than the distance between said opposite sides of said low-flexibility flange portion, and a plurality of circumferentially radially spaced slots extending completely through said bead and completely through said socket portion to said annular higher-flexibility zone.

2. A snap fastener as defined in claim 1, wherein at least one of said components is at least in part composed of resiliently deformable material to thereby admit of passage of said head through said opening.

3. A snap fastener as defined in claim 2, wherein said material is a synthetic plastic material.

4. A snap fastener as defined in claim 2, wherein said higher-flexibility zone is constituted by an annular groove provided in said flange portion at said other side proximal to the juncture of said flange portion with said socket portion, and surrounding the latter.

5. A snap fastener as defined in claim 2, wherein said socket portion projects beyond said other side.

6. A snap fastener as defined in claim 1, wherein said slots extend over the entire axial length of said socket portion and to said one side of said flange portion.

7. A snap fastener as defined in claim 2, wherein said higher-flexibility zone comprises a kerf provided at said other side in said socket portion in the region of the juncture of the latter with said flange portion.

8. A snap fastener as defined in claim 7, said higher-flexibility zone further comprising an annular groove provided in said flange portion at said other side thereof proximal to the juncture of said flange portion with said socket portion, and surrounding the latter.

References Cited

UNITED STATES PATENTS

| | | | |
|---|---|---|---|
| 2,368,100 | 1/1945 | Boenecke | 24—216 |
| 3,210,820 | 10/1965 | Humiston | 24—208.3 UX |
| 3,401,434 | 9/1968 | Daddona | 24—208.3 UX |

FOREIGN PATENTS

| | | | |
|---|---|---|---|
| 268,500 | 4/1962 | Australia | 24—208.3 |
| 16,365 | 7/1910 | Great Britain | 24—208.3 |
| 1,024,220 | 3/1966 | Great Britain | 24—208.3 |
| 546,770 | 8/1956 | Italy | 24—208.3 |

BERNARD A. GELAK, Primary Examiner